(12) United States Patent
Huang et al.

(10) Patent No.: US 10,401,887 B2
(45) Date of Patent: Sep. 3, 2019

(54) STARTUP CIRCUIT TO INITIALIZE VOLTAGE REFERENCE CIRCUIT

(71) Applicant: HEWLETT PACKARD ENTERPRISE DEVELOPMENT LP, Houston, TX (US)

(72) Inventors: Tsung-Ching Huang, Palo Alto, CA (US); Chin-Hui Chen, Palo Alto, CA (US); Cheng Li, Palo Alto, CA (US)

(73) Assignee: Hewlett Packard Enterprise Devlopment LP, Houston, TX (US)

( * ) Notice: Subject to any disclaimer, the term of this patent is extended or adjusted under 35 U.S.C. 154(b) by 0 days.

(21) Appl. No.: 15/745,993

(22) PCT Filed: Jul. 22, 2015

(86) PCT No.: PCT/US2015/041594
§ 371 (c)(1),
(2) Date: Jan. 18, 2018

(87) PCT Pub. No.: WO2017/014776
PCT Pub. Date: Jan. 26, 2017

(65) Prior Publication Data
US 2018/0217625 A1   Aug. 2, 2018

(51) Int. Cl.
*G05F 1/565* (2006.01)
*H02M 1/36* (2007.01)

(52) U.S. Cl.
CPC .............. *G05F 1/565* (2013.01); *H02M 1/36* (2013.01)

(58) Field of Classification Search
CPC ...................... G05F 1/561–1/565; H02M 1/36
See application file for complete search history.

(56) References Cited

U.S. PATENT DOCUMENTS

| 4,857,823 A | 8/1989 | Bitting |
| 5,867,013 A | 2/1999 | Yu |
| 6,084,388 A | 7/2000 | Toosky |
| 6,160,392 A | 12/2000 | Shin |

(Continued)

FOREIGN PATENT DOCUMENTS

JP   2012133512 A   * 7/2012

OTHER PUBLICATIONS

International Search Report & Written Opinion received in PCT Application No. PCT/US2015/041594, dated Apr. 21, 2016, 13 pages.

(Continued)

*Primary Examiner* — Kyle J Moody
*Assistant Examiner* — Peter M Novak
(74) *Attorney, Agent, or Firm* — Sheppard Mullin Richter & Hampton LLP

(57) ABSTRACT

A circuit includes a startup circuit to provide a charging signal to initiate startup of a reference circuit. The startup circuit includes a detector circuit having a detector current path control, a level shifter having a level shifter current path control, and a charger circuit having a charger current path control. Each of the detector current path control, the level shifter current path control, and the charger circuit current path control enable current flow in the startup circuit when the charger turn-on signal is in the on-state and disable the current flow in the startup circuit when the charger turn-on signal is in the off state.

12 Claims, 5 Drawing Sheets

(56) References Cited

U.S. PATENT DOCUMENTS

| | | | |
|---|---|---|---|
| 6,201,435 | B1 | 3/2001 | Chou |
| 7,626,374 | B2 | 12/2009 | Haiplik |
| 8,228,053 | B2 | 7/2012 | Stellberger et al. |
| 8,294,449 | B2 | 10/2012 | Ide |
| 2005/0052173 | A1* | 3/2005 | Neaves ............ G05F 3/30 323/315 |
| 2008/0104433 | A1 | 5/2008 | May et al. |
| 2008/0231248 | A1 | 9/2008 | Hung |
| 2011/0006749 | A1 | 1/2011 | Stellberger et al. |

OTHER PUBLICATIONS

Kulbhushan M. et al., "Low Power Startup Circuits for Voltage and Current Reference with Zero Steady State Current," Proceedings for Low Power Electronics and Design Aug. 25-27, 2003 pp. 184-188, http://ieeexplore.ieee.org/xpl/login.jsp?tp=&arnumber=1231859&url=http%3A%2F%2Fieeexplore.ieee.org%2Fxpls%2Fabs_all.jsp%3Farnumber%3D1231859.

* cited by examiner

STARTUP CIRCUIT TO INITIALIZE VOLTAGE REFERENCE CIRCUIT

STATEMENT OF GOVERNMENT INTEREST

This invention was made with government support under Agreement Number H98230-14-3-0011. The government has certain rights in the invention.

BACKGROUND

Analog and mixed-signal circuits often require high-precision reference voltages and currents to bias the circuits properly. Such circuits are often employed in battery operated mobile devices. A CMOS bandgap (BG) reference is widely used to provide process and temperature independent bias voltage and current for such analog/mixed-signal circuits. A start-up circuit in BG reference is designed to initialize the BG reference until it reaches normal operation which is the desired voltage operating range. Conventional startup-circuits consume static currents even during normal operation of the BG reference in order to stay active for monitoring the BG reference output.

DETAILED DESCRIPTION

This disclosure relates to a startup circuit to initialize a voltage reference circuit such as a bandgap voltage reference, for example. A low-power startup circuit is provided to initialize a CMOS bandgap reference circuit in one example. The startup circuit can detect if the reference circuit is functioning at its desired voltage operating range and if not, it can initiate startup mode for the reference circuit by injecting current into the reference circuit until it reaches the normal operation mode where the reference voltage output of the circuit has stabilized. The startup circuit includes a detector circuit, level shifter, and charger circuit to facilitate driving the reference circuit output voltage to its desired operating range in a rapid manner when voltage is applied to the circuit. Each of the detector circuit, level shifter, and charge circuit include current path controls to disable substantially all current flow in the startup circuit during normal operations of the reference circuit. During normal operation, the startup circuit is shut-down via the respective current path controls and thus, consumes very-low power that can effectively extend battery lifetime for mobile devices and improve energy efficiency.

Conventional startup circuits have a detector designed to observe the reference voltage or current output and determine if it is in the desired operation mode of the detector. If reference voltage/current output is out of the range from expected values, the startup circuit will inject current into the reference until the expected voltage/current output value is reached. However, the startup circuit in conventional circuits cannot be completely shut-down even during normal operation in order to stay active for continuous monitoring of the reference voltage output. This inevitably consumes more power from the energy sources such as a battery and can significantly reduce battery lifetime of mobile devices.

Figure 1:
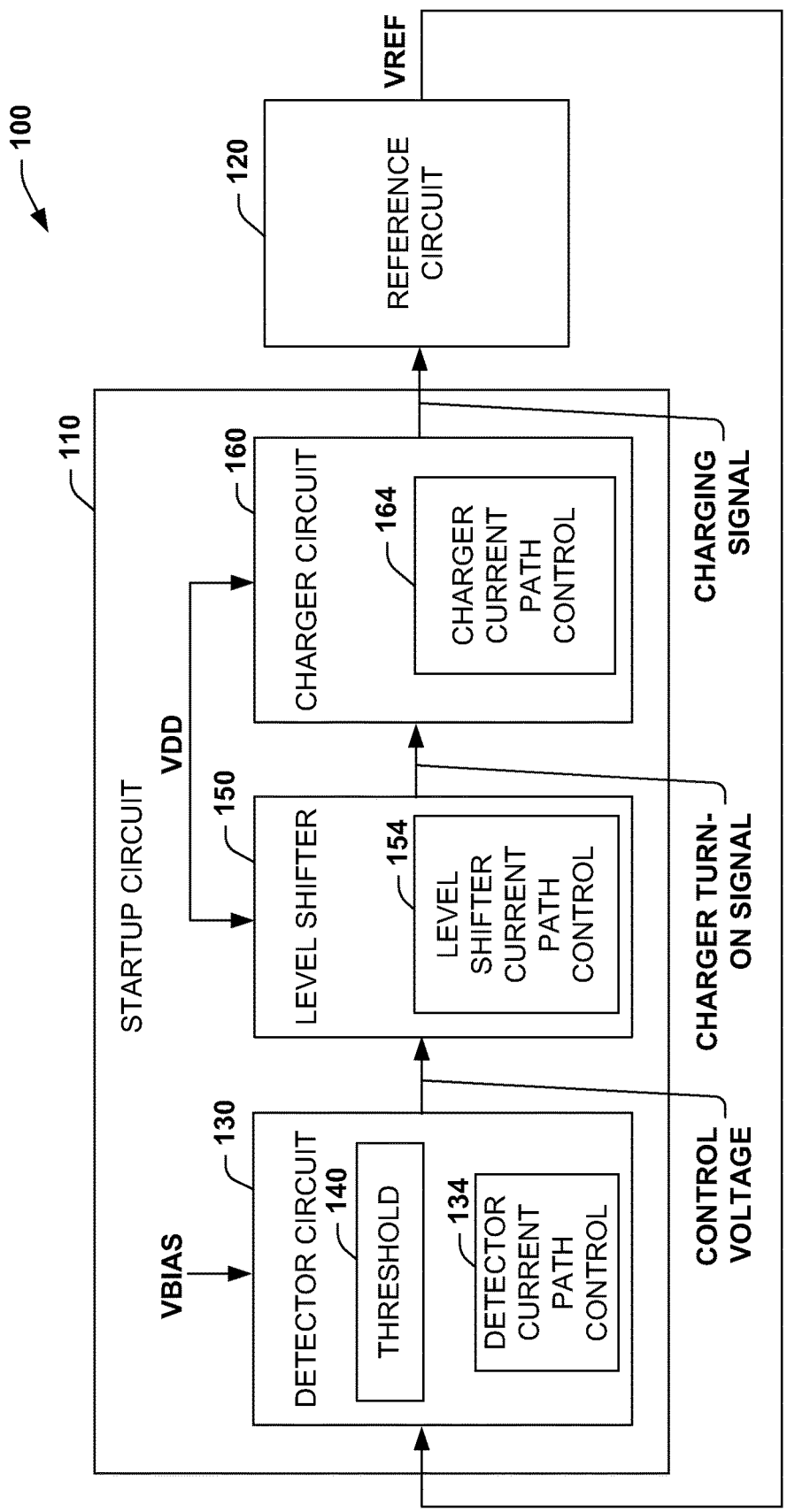
FIG. 1 illustrates an example of a startup circuit to facilitate startup of a voltage reference circuit, where current flow in the startup circuit is disabled to conserve power after the reference circuit reaches its desired voltage operating range.

FIG. 1 illustrates an example of a circuit 100 that includes a startup circuit 110 to facilitate startup of a voltage reference circuit 120, where current flow in the startup circuit is disabled to conserve power after the reference circuit reaches its desired voltage operating range. As used herein, the term circuit can include a collection of active and/or passive elements that perform a circuit function such as an analog circuit or control circuit, for example. The term circuit can also include an integrated circuit where all the circuit elements are fabricated on a common substrate, for example.

The startup circuit 110 provides a charging signal to initiate startup of the reference circuit 120. This includes injecting voltage and charge into the reference circuit 120 such that an output voltage VREF achieves its desired operating level as soon as possible after power is applied. The startup circuit 110 includes a detector circuit 130 having a detector current path control 134 to enable and disable current within the detector circuit. The detector circuit 130 monitors the reference voltage VREF of the reference circuit 120 with respect to a predetermined threshold voltage 140. The detector circuit 130 switches states of a control voltage output based on sensing the voltage level of the reference voltage VREF with respect to the predetermined threshold voltage 140.

The startup circuit 110 includes a level shifter 150 having a level shifter current path control 154 to enable and disable current flow in the level shifter. The level shifter 150 generates a charger turn-on signal in response to the control voltage output from the detector circuit 130. The charger turn-on signal is in an on state to enable the charging signal when the reference voltage VREF is below the predetermined threshold voltage 140 and the charger turn-on signal is in an off-state to disable the charging signal when the reference voltage VREF is above the predetermined threshold voltage.

The startup circuit 110 also includes a charger circuit 160 having a charger current path control 164 to enable and disable current flow in the charger circuit. The charger circuit 160 generates the charging signal when the charger turn-on signal from the level shifter 150 is in the on state. Each of the detector current path control 134, the level shifter current path control 154, and the charger circuit current path control 164 enable current flow in the startup circuit 110 when the charger turn-on signal is in the on-state and disable the current flow in the startup circuit when the charger turn-on signal is in the off state. As used herein, the term disable current flow refers to reducing current flow in the startup circuit 110 to substantially zero amperes. Thus, the current flow in the startup circuit 110 after the reference circuit 120 has achieved operating level is generally a function of leakage currents in each of the detector circuit 130, the level shifter circuit 150, and the charger circuit 160 when the charger turn-on signal is in the off state.

Figure 4:
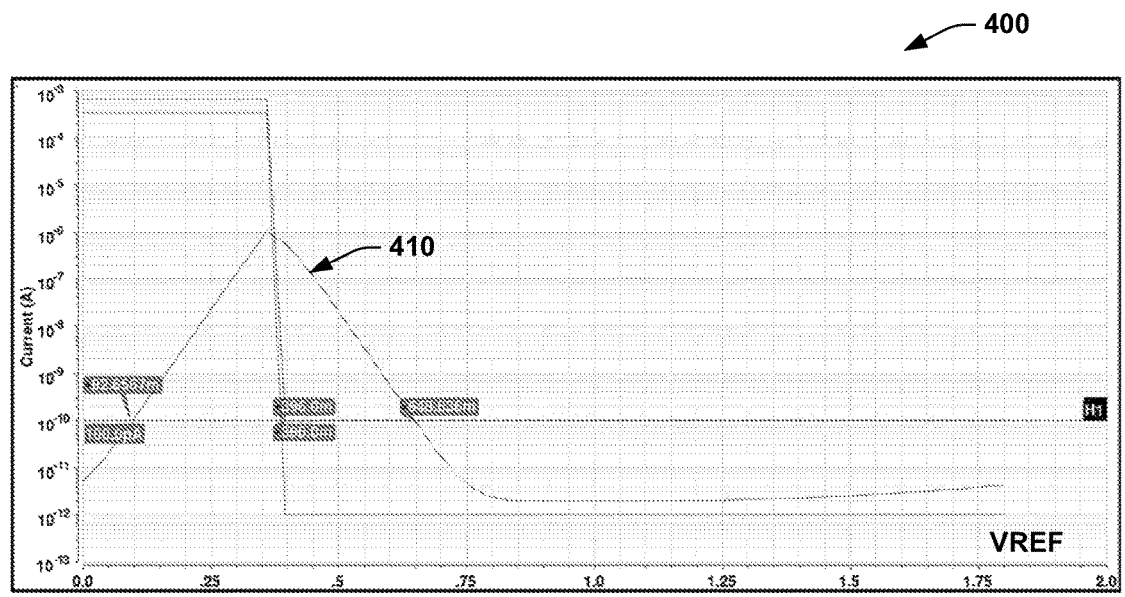
FIG. 4 illustrates an example of a current level diagram for the startup circuit of FIG. 2 depicting how startup current is reduced after detector circuit switching.

More particularly, the current flow in the startup circuit 110 when the charger turn-on signal is in the off state is collectively reduced to about a picoampere such that the power in the startup circuit is about a picowatt (See e.g., graph of FIG. 4). Thus, in contrast to conventional circuits that leave some current flow in the startup circuit to continue to monitor VREF, the startup circuit 110 disables all current paths such that substantially no current is flowing in the startup circuit after the reference circuit 120 has achieved desired operating levels for VREF. This enables battery operated devices to consume less power since the startup circuit is disabled during normal operations of the reference circuit 120 (e.g., no active monitoring of VREF).

As shown, the detector circuit 130 operates off of a bias voltage VBIAS and the level shifter 150 and the charger circuit 160 operates off of a battery voltage VDD. The bias voltage can be derived from the battery voltage VDD and can be set in a range that is less than the battery voltage up to about the value of the battery voltage. For example, if VDD is 1.8V, the bias voltage VBIAS can be set at 0.8V although other voltages are possible for VDD and/or VBIAS. In one example, the predetermined threshold voltage 140 can be set to about one half of the bias voltage VBIAS although other settings are possible. As noted above, the reference circuit 120 receives injected charge from the charging signal of the charger circuit 160. In one example, the reference circuit 120 can be a bandgap reference circuit (See e.g., FIGS. 2 and 5). The reference circuit 120 can supply the reference voltage output VREF to a battery operated mobile device (See e.g., FIG. 6). In some cases, the reference circuit 120 can include a pair of transistors to receive the injected charge from the charger circuit 160. This can include a pair of PNP transistors (See e.g., FIG. 2) or a pair of NPN transistors (See e.g., FIG. 5) to receive the injected charge from the charging signal of the charger circuit 160.

Figure 2:
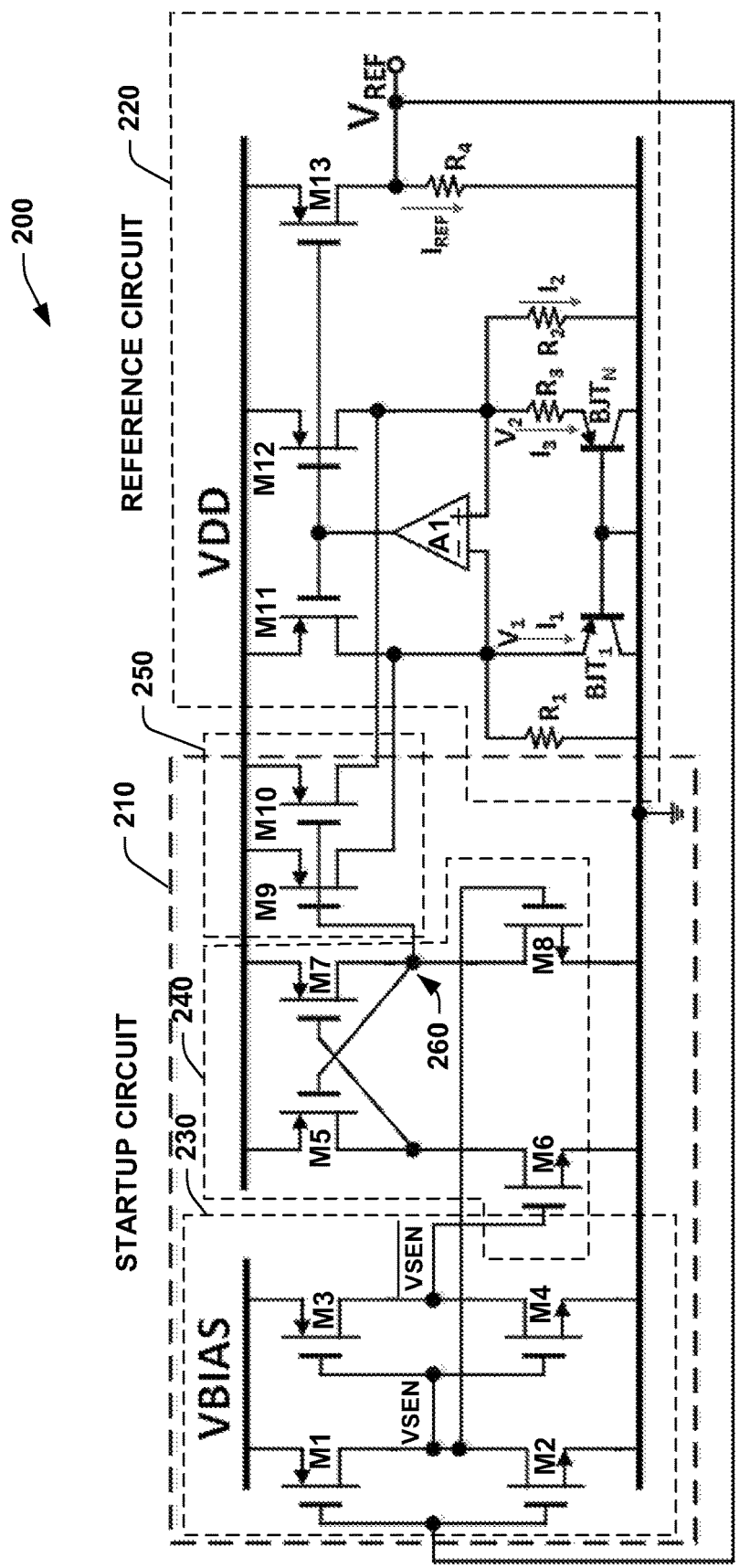
FIG. 2 illustrates an example of a startup circuit implementation to facilitate startup of a voltage reference circuit, where current flow in the startup circuit is disabled to conserve power after the reference circuit reaches its desired voltage operating range.

FIG. 2 illustrates an example of a circuit 200 that includes a startup circuit 210 implementation to facilitate startup of a voltage reference circuit 220, where current flow in the startup circuit is disabled to conserve power after the reference circuit reaches its desired voltage operating range. The startup circuit 210 includes a detector circuit 230, a level shifter 240, and charger circuit 250 that collectively operate to inject charge into the reference circuit 220 during startup of the reference circuit. The detector circuit 230 includes transistors M1, M2, M3, and M4. The level shifter 240 includes transistors M5, M6, M7, and M8, where M5 and M7 are cross-coupled and operate to pull the charger circuit 250 output to the supply rail VDD during charging. Transistors M9 and M10 form the charger circuit 250 where output from each injects charge into BJT1 and BJTN of the reference circuit 220. Transistors M6, M8 along with M1, M2, M3, and M4 of the detector circuit 230, function as current path controls as described herein to enable and disable current flow in the startup circuit 210 depending on the reference circuit 220 output VREF.

When the reference output voltage VREF is low or close to 0V, which is considered out of the range from expected reference output voltages, this can be detected by CMOS detector M1 and M2 of detector circuit 230. The detector output voltage level at node VSEN will then be at about VBIAS and the voltage at node/VSEN will be pulled down to about 0V via voltage inverter M3 and M4. The output of the level shifter 240 (M5/M6/M7/M8) at node 260 will be at about 0 V that can switch on the charger circuit 250 (M9/M10) in order to inject current into reference circuit 220. If VREF has reached its expected voltage value for normal operation (e.g., 0.8V), the node VSEN will become about 0V and the voltage level at node/VSEN will be about VBIAS which causes the voltage output at node 260 to become about VDD and thus switch off the charger circuit 250. During normal operation of the reference circuit 220, the startup circuit 210 is substantially shut down and consumes substantially only leakage power in the range of picowatts.

It is noted that VBIAS can be provided either externally or internally and a high-precision voltage source is not required. If multiple voltage domains are available, the low-voltage domain (e.g., 0.8V) can be used for VBIAS while the high-voltage domain can be set at VOD. It is also noted that the startup circuit 210, the voltage reference circuit 220, the detector circuit 230, the level shifter 240, and the charger circuit 250 can be implemented with thick-oxide 1.8V/2.5V MOSFET for wide operational range of VREF from one half of VBIAS to VDD (e.g., 1.8V or 2.5V).

As shown, the reference circuit 220 can include and amplifier A1 that regulates the output VREF via transistors M11, M12, and M13. Transistors BJT1 and BJTN receive charge from the charger circuit 250 and drive the inputs to A1. Resistors R1, R2, R3, and R4 can be selected as follows. In general, VBE1 of BJT1 has a negative temperature coefficient (TC) where V1−VBEN of BJTN (ΔVBE) has positive TC. The values for R2, R3, and N can then be selected for a substantially constant VREF. Assuming V1=V2=V, R1=R2=R, then: VREF=IREF*R4=R4(VBE1/R2+(kT/q*ln(N))/R3). The term IREF which controls VREF is equal to I2+I3. The combination of I2+I3 equals V2/R2+(V2−VBEN)/R3 which equals V2/R2+(V1−VBEN)/R3 which equals V/R2+(kT/q*ln(N))/R3. When VREF is lower than VTRIP (See e.g., FIG. 3) when the startup circuit 210 and reference circuit 220 begins to operate, VSEN=VBIAS (e.g., 0.8V) and VCHARGE at node 260 is 0V which activates PMOS chargers M9 and M10 to pull V1 and V2 to high.

Figure 3:
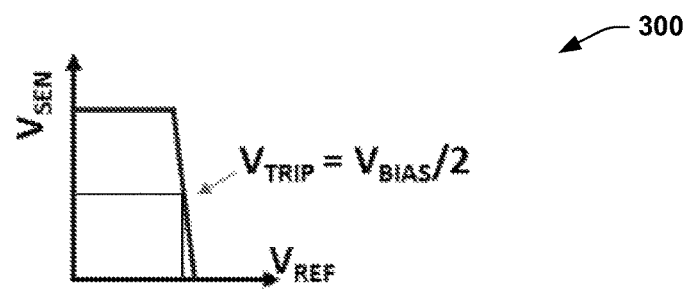
FIG. 3 illustrates an example voltage level diagram for the startup circuit of FIG. 2 depicting voltage level thresholds for detector circuit control.

FIG. 3 illustrates an example voltage level diagram 300 for the startup circuit of FIG. 2 depicting voltage level thresholds for detector circuit control. The voltage of node VSEN from FIG. 2 is shown on the vertical axis versus the value of VREF overtime on the horizontal axis. As shown, when VSEN reaches a predetermined threshold value of VTRIP, detector circuit switching changes states where the charging signal is turned off and all current paths in the startup circuit are disabled. The value of VTRIP can be set as VBIAS/2 but other threshold values are possible by different sizing of channel widths and lengths of M1 and M2 in the detector circuit 230.

FIG. 4 illustrates an example of a current level diagram 400 for the startup circuit of FIG. 2 depicting how startup current is reduced after detector circuit switching. Current in amperes is depicted on the vertical axis versus the output VREF on the horizontal axis. As shown, startup current at 410 of FIG. 2 reaches a maximum of about 1 microampere when the detector circuit threshold for VREF is achieved (0.4V in this example) and while charge injection to the reference circuit is proceeding. When VREF is substantially greater than the threshold (0.6V in this example), the startup circuit current of FIG. 2 has decreased to picoamperes or less.

Figure 5:
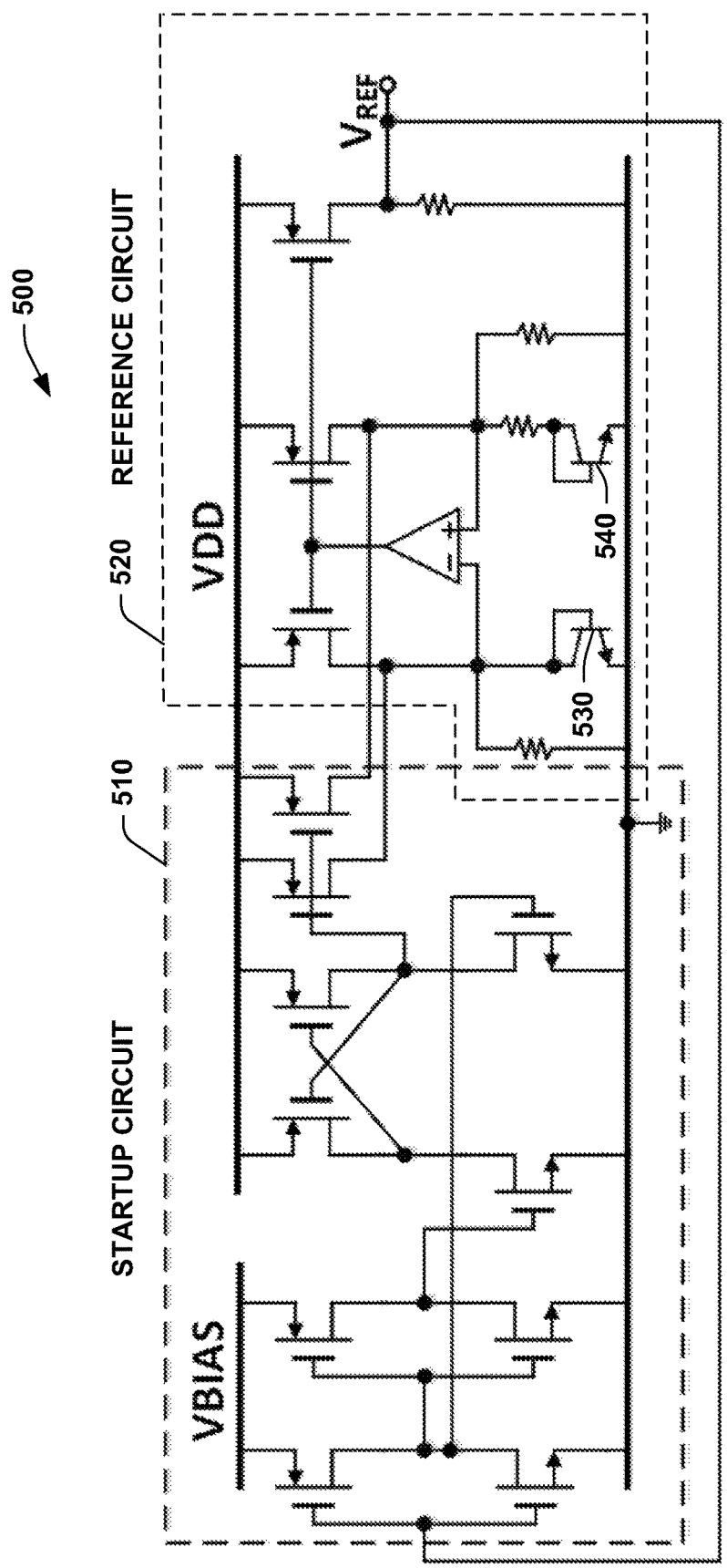
FIG. 5 illustrates an alternative example of a startup circuit implementation to facilitate startup of a voltage reference circuit, where current flow in the startup circuit is disabled to conserve power after the reference circuit reaches its desired voltage operating range.

FIG. 5 illustrates an alternative circuit 500 of a startup circuit 510 to facilitate startup of a voltage reference circuit 520, where current flow in the startup circuit is disabled to conserve power after the reference circuit reaches its desired voltage operating range. In this example, for purposes of brevity each component of the startup circuit 510 and reference circuit is not described as there are similar operations with the circuit described in FIG. 2. In this example, an alternative reference circuit implementation shown where the pair of transistors receiving charge from the startup circuit 510 is an NPN pair 530 and 540 versus the PNP pair of BJT1 and BJTN depicted in FIG. 2. If VREF were a negative value versus a positive value, other transistors in the circuit 500 could change from PNP to NPN or vice versa.

Figure 6:
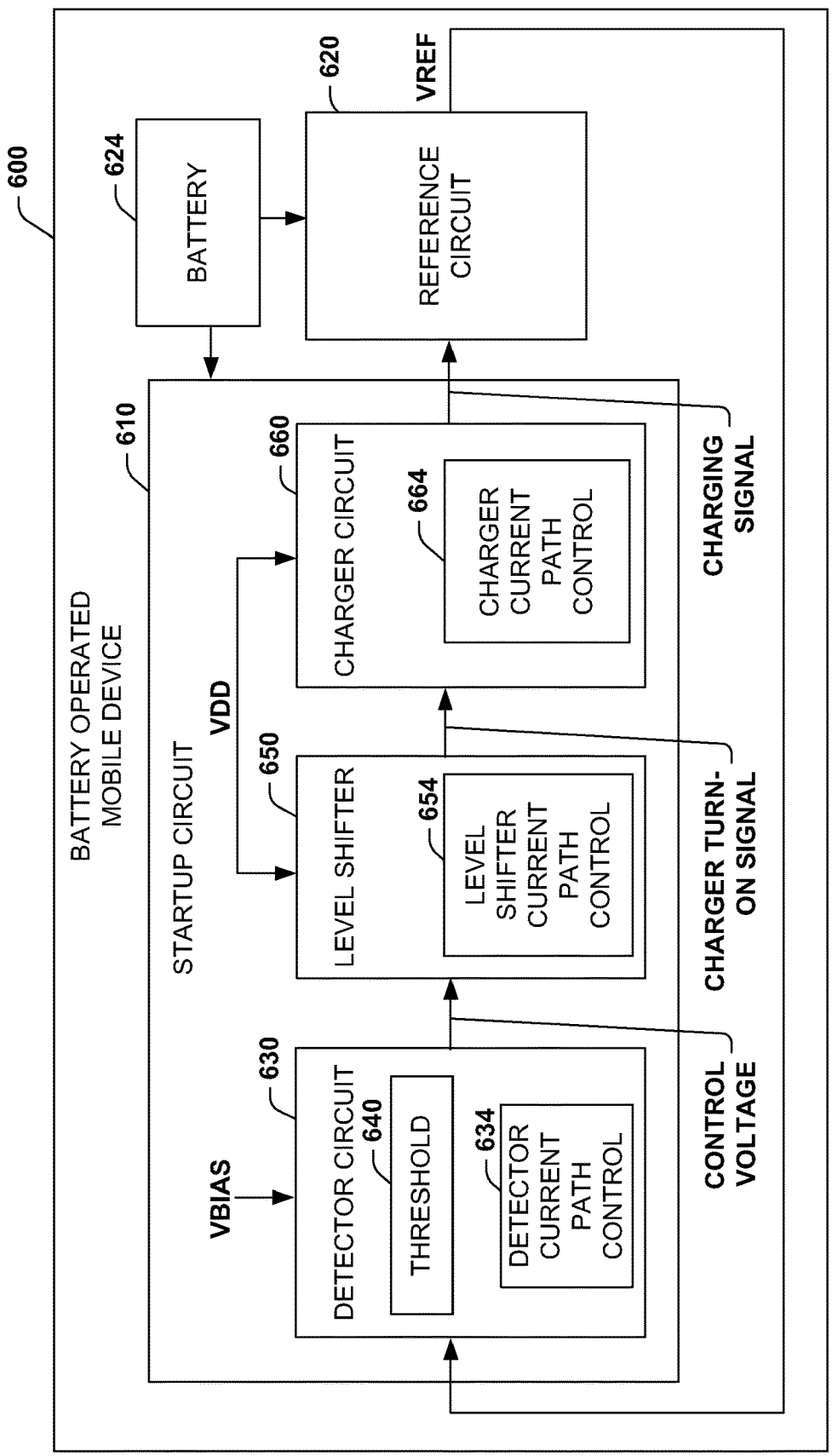
FIG. 6 illustrates an apparatus that includes a battery operated mobile device that employs a startup circuit to facilitate startup of a voltage reference circuit, where current flow in the startup circuit is disabled to conserve power after the reference circuit reaches its desired voltage operating range.

FIG. 6 illustrates an apparatus that includes a battery operated mobile device 600 that employs a startup circuit 610 to facilitate startup of a voltage reference circuit 620, where current flow in the startup circuit is disabled to conserve power after the reference circuit reaches its desired voltage operating range. The battery operated mobile device 600 can be substantially any type of mobile device such as a cell phone, laptop, personal entertainment device, and so forth. The battery operated mobile device 600 includes a battery 624 that powers the reference circuit to provide a reference output voltage VREF to the battery operated mobile device. The startup circuit also operates off the battery 624 and provides a charging signal to initiate startup of the reference circuit 620. The startup circuit 610 includes a detector circuit 630 having a detector current path control 634. The detector circuit 630 monitors the reference voltage VREF of the reference circuit 620 with respect to a predetermined threshold voltage 640. The detector circuit 630 switches states of a control voltage output based on sensing the voltage level of the reference voltage VREF with respect to the predetermined threshold voltage 640.

The startup circuit 610 includes a level shifter 650 having a level shifter current path control 654. The level shifter 650 generates a charger turn-on signal in response to the control voltage output from the detector circuit 630. The charger turn-on signal is in an on state to enable the charging signal when the reference voltage is below the predetermined threshold voltage 640 and the charger turn-on signal is in an off-state to disable the charging signal when the reference voltage is above the predetermined threshold voltage. The startup circuit includes a charger circuit 660 having a charger current path control 664. The charger circuit generates the charging signal when the charger turn-on signal from the level shifter 650 is in the on state.

Each of the detector current path control 634, the level shifter current path control 654, and the charger circuit current path control 664 enable current flow in the startup circuit 610 when the charger turn-on signal is in the on-state and disable the current flow in the startup circuit when the charger turn-on signal is in the off state. As noted previously, current flow in the startup circuit 610 when the charger turn-on signal is in the off state is collectively reduced to about a picoampere such that the power in the startup circuit is about a picowatt.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A circuit, comprising:
   a startup circuit to provide a charging signal to initiate startup of a reference circuit;
   the startup circuit comprising:
      a detector circuit having a detector current path control, the detector circuit to monitor a reference voltage of the reference circuit with respect to a predetermined threshold voltage, the detector circuit switches states of a control voltage output based on sensing a voltage level of the reference voltage with respect to the predetermined threshold voltage;
      a level shifter circuit having a level shifter current path control, the level shifter to generate a charger turn-on signal in response to the control voltage output from the detector circuit, the charger turn-on signal is in an on state to enable the charging signal when the reference voltage is below the predetermined threshold voltage and the charger turn-on signal is in an off state to disable the charging signal when the reference voltage is above the predetermined threshold voltage;
      a charger circuit having a charger current path control, the charger circuit generates the charging signal when the charger turn-on signal from the level shifter is in the on state, wherein each of the detector current path control, the level shifter current path control, and the charger circuit current path control enable current flow in the startup circuit when the charger turn-on signal is in the on-state and disable the current flow in the startup circuit when the charger turn-on signal is in the off state; and
      wherein the current flow in the startup circuit when the charger turn-on signal is in the off state is collectively reduced to a range of picoamperes such that the power in the startup circuit is within a range of picowatts.

2. The circuit of claim 1, wherein the current flow in the startup circuit is a function of leakage currents in each of the detector circuit, the level shifter circuit, and the charger circuit when the charger turn-on signal is in the off state.

3. The circuit of claim 1, further comprising a reference circuit to receive injected charge from the charging signal of the charger circuit.

4. The circuit of claim 1, wherein the detector circuit operates off of a bias voltage and the level shifter and the charger circuit operate off a battery voltage, the bias voltage is derived from the battery voltage and is set in a range that is less than the battery voltage up to the value of the battery voltage.

5. The circuit of claim 1, wherein the predetermined threshold voltage is within a range of one half of the bias voltage.

6. The circuit of claim 3, wherein the reference circuit is a bandgap reference circuit.

7. The circuit of claim 3, wherein the reference circuit supplies a reference voltage to a battery operated mobile device.

8. The circuit of claim 3, wherein the reference circuit includes a pair of PNP transistors or a pair of NPN transistors to receive the injected charge from the charging signal of the charger circuit.

9. A circuit, comprising:
   a reference circuit to provide a reference output voltage;
   a startup circuit to provide a charging signal to initiate startup of the reference circuit;
   the startup circuit comprising;
a detector circuit having a detector current path control, the detector circuit to monitor a reference voltage of the reference circuit with respect to a predetermined threshold voltage, the detector circuit switches states of a control voltage output based on sensing a voltage level of the reference voltage with respect to the predetermined threshold voltage;
   a level shifter having a level shifter current path control, the level shifter to generate a charger turn-on signal in response to the control voltage output from the detector circuit, the charger turn-on signal is in an on state to enable the charging signal when the reference voltage is below the predetermined threshold voltage and the charger turn-on signal is in an off-state to disable the charging signal when the reference voltage is above the predetermined threshold voltage;
   a charger circuit having a charger current path control, the charger circuit generates the charging signal when the charger turn-on signal from the level shifter is in the on state, wherein each of the detector current path control, the level shifter current path control, and the charger circuit current path control enable current flow in the startup circuit when the charger turn-on signal is in the on-state and disable the current flow in the startup circuit when the charger turn-on signal is in the off state; and
   wherein the current flow in the startup circuit when the charger turn on signal is in the off state is collectively reduced to a range of picoamperes such that the power in the startup circuit is within a range of picowatts.

10. The circuit of claim 9, wherein the current flow in the startup circuit is a function of leakage currents in each of the detector circuit, the level shifter circuit, and the charger circuit when the charger turn-on signal is in the off state.

11. The circuit of claim 9, wherein the reference circuit supplies the reference output voltage to a battery operated mobile device.

12. An apparatus, comprising:
   a battery operated mobile device;
   a reference circuit to provide a reference output voltage to the battery operated mobile device; and
   a startup circuit to provide a charging signal to initiate startup of the reference circuit, the startup circuit comprising:
      a detector circuit having a detector current path control, the detector circuit to monitor a reference voltage of the reference circuit with respect to a predetermined threshold voltage, the detector circuit switches states of a control voltage output based on sensing a voltage level of the reference voltage with respect to the predetermined threshold voltage;
      a level shifter having a level shifter current path control, the level shifter to generate a charger turn-on signal in response to the control voltage output from the detector circuit, the charger turn-on signal is in an on state to enable the charging signal when the reference voltage is below the predetermined threshold voltage and the charger turn-on signal is in an off-state to disable the charging signal when the reference voltage is above the predetermined threshold voltage;
      a charger circuit having a charger current path control, the charger circuit generates the charging signal when the charger turn-on signal from the level shifter is in the on state, wherein each of the detector current path control, the level shifter current path control, and the charger circuit current path control enable current; and
   wherein the current flow in the startup circuit when the charger turn-on signal is in the off state is collectively reduced to a range of picoamperes such that the power in the startup circuit is within a range of picowatts.

* * * * *